Figure 1:
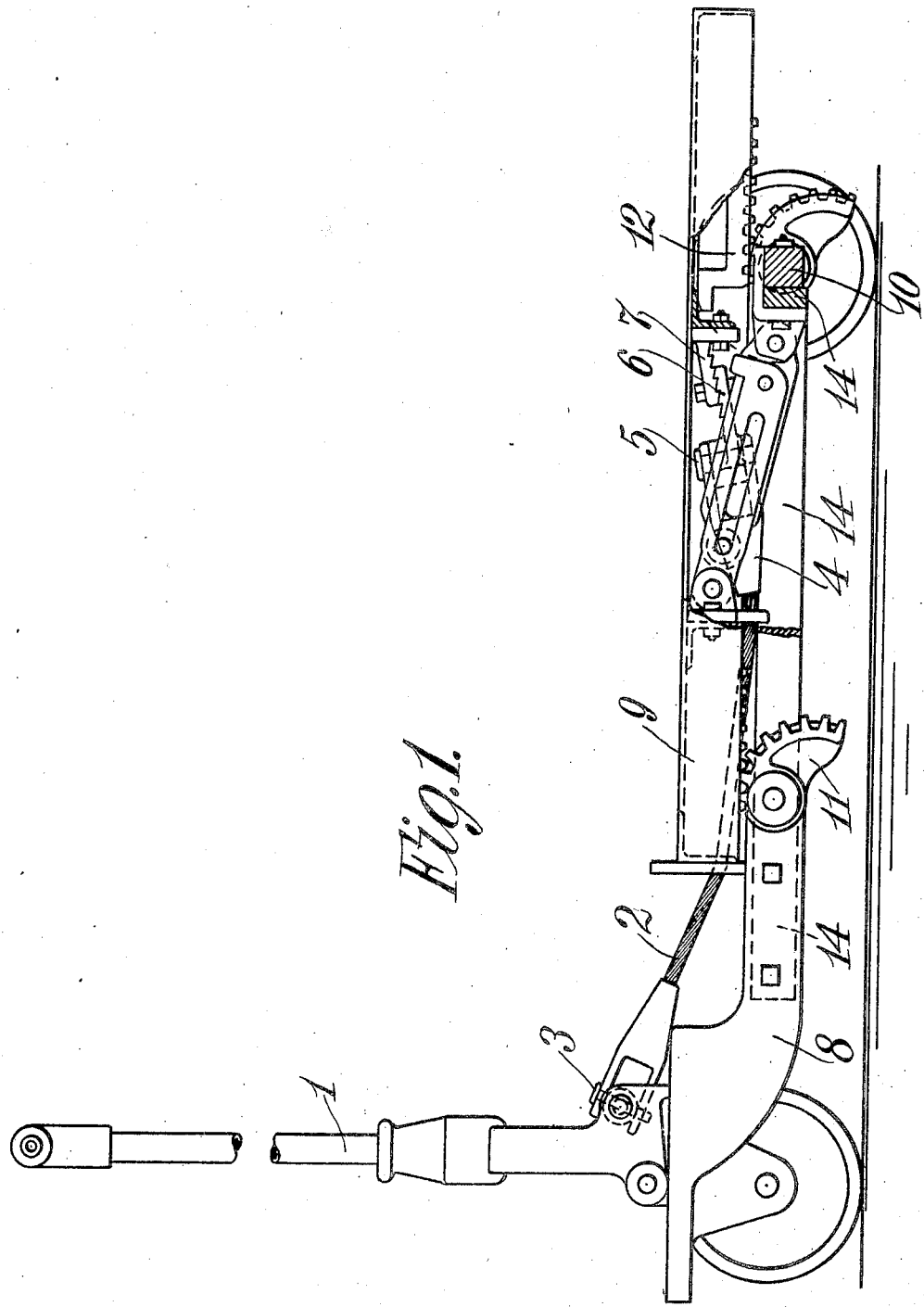

G. E. CLARK.
ELEVATING TRUCK.
APPLICATION FILED MAR. 16, 1914.

1,102,876.

Patented July 7, 1914.
3 SHEETS—SHEET 1.

WITNESSES:
H. E. Hartwell
E. M. Potter

INVENTOR.
George E. Clark.
BY
Chapin & Co
ATTORNEY.

G. E. CLARK.
ELEVATING TRUCK.
APPLICATION FILED MAR. 16, 1914.
1,102,876.
Patented July 7, 1914.
3 SHEETS—SHEET 2.
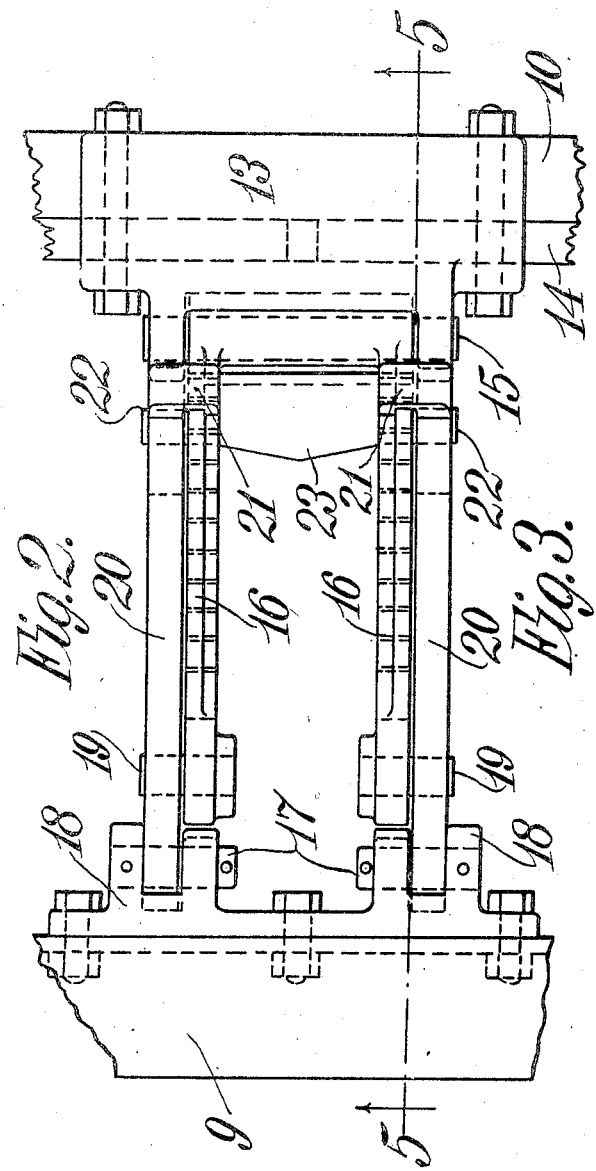
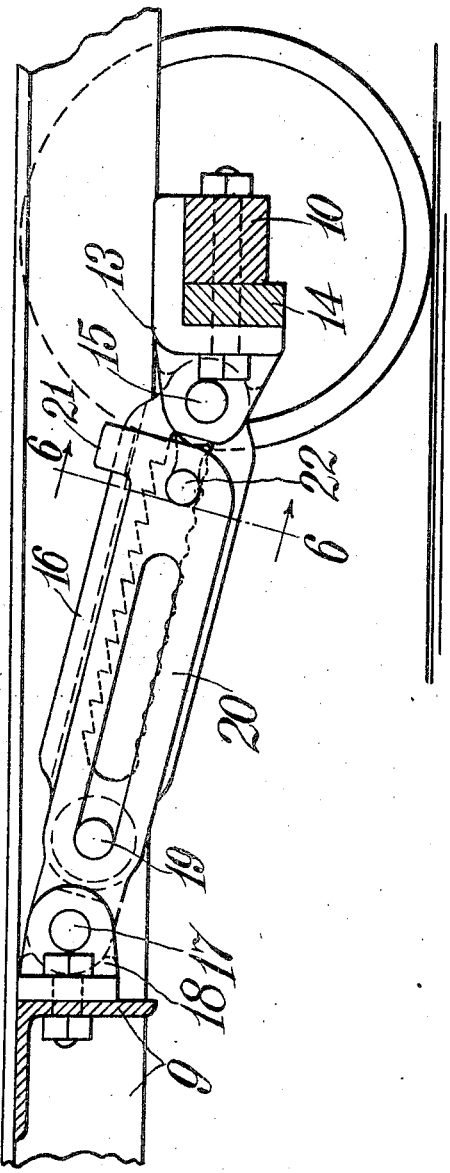
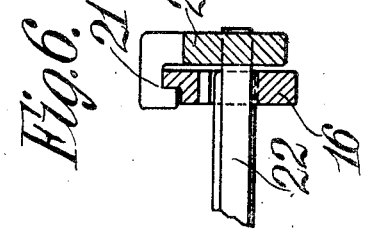
WITNESSES:
H. E. Hartwell
C. M. Potter
INVENTOR.
George E. Clark.
BY Chapin + Co
ATTORNEY.

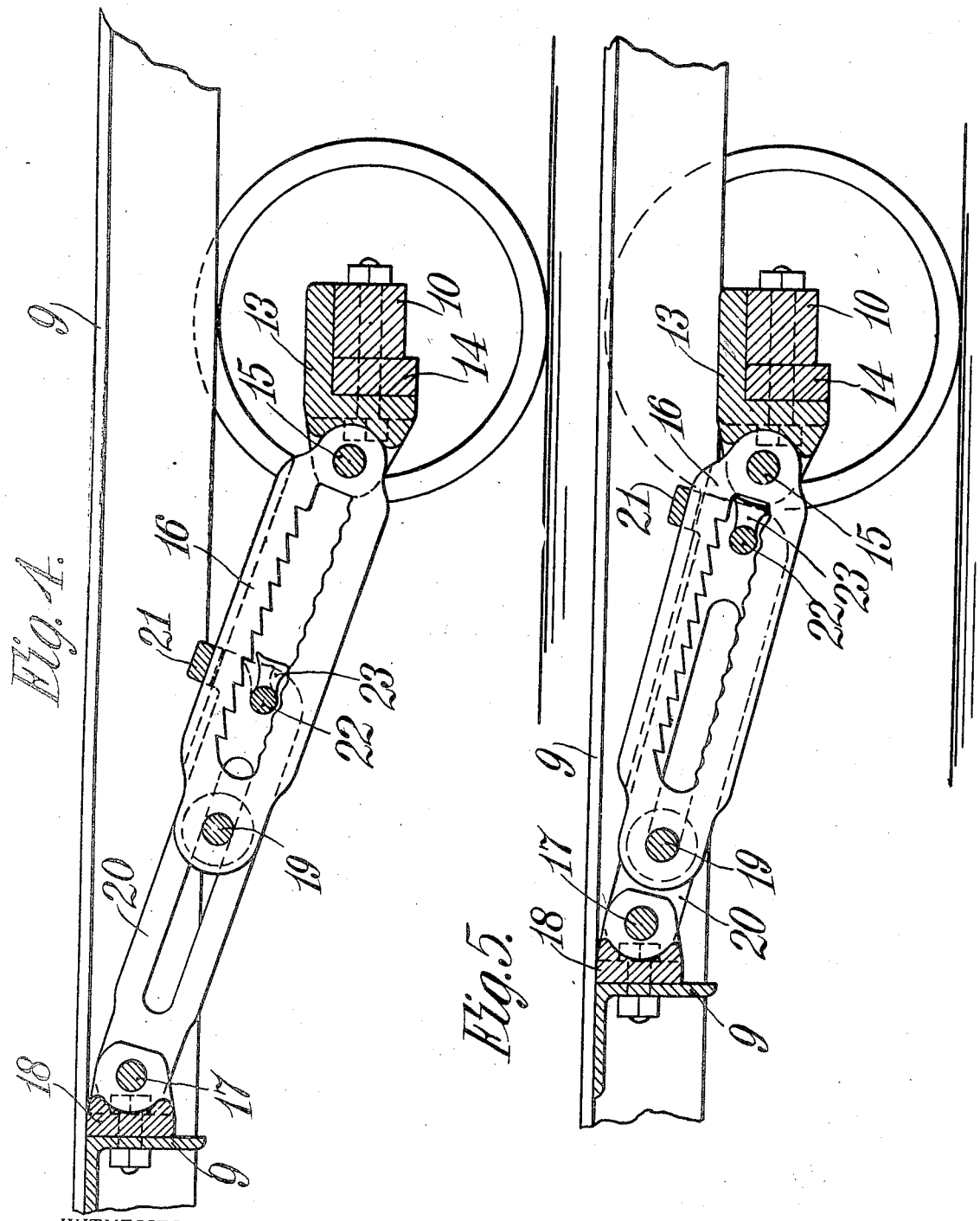

UNITED STATES PATENT OFFICE.

GEORGE E. CLARK, OF WINDSOR LOCKS, CONNECTICUT, ASSIGNOR TO GEORGE P. CLARK COMPANY, OF WINDSOR LOCKS, CONNECTICUT, A CORPORATION OF CONNECTICUT.

ELEVATING-TRUCK.

1,102,876.	Specification of Letters Patent.	Patented July 7, 1914.

Application filed March 16, 1914. Serial No. 824,867.

*To all whom it may concern:*

Be it known that I, GEORGE E. CLARK, a citizen of the United States, residing in Windsor Locks, county of Hartford, and State of Connecticut, have invented certain new and useful Improvements in Elevating-Trucks, of which the following is a specification.

This invention relates to an improved elevating truck and mechanism to be used therewith.

An elevating truck of the general class referred to is shown by the patent to Gledhill, #790,495.

The object of the invention is to provide in an elevating truck an automatic safety or holding device preferably mechanically operable as distinguished from a pneumatic or hydraulic operation.

A further object of the invention is to provide an automatic safety device which is operable to positively hold the load supporting member of the truck stationary when the device operates for its safety or holding function.

Another object of the invention is to provide a device of the class mentioned, which is combined with suitable means for disconnecting said device after it is operated in order that the load supporting member of the truck may be lowered.

Another object of the invention is to provide mechanism of the class described which will operate to hold the load supporting member of the truck in an elevated position whenever the load supporting member is being lowered from an elevated position beyond a predetermined speed.

Another object of the invention is to provide mechanism of the kind mentioned, combined with an elevating truck and operable to hold the load supporting member at any point above its lowermost position until released by the operator.

Another object of the invention is to provide an automatically operable safety device for an elevating truck which will operate to hold the load supporting member of the truck at any point above its lowermost position, which device is controlled by the handle of the truck for its release operation.

Another object of the invention is to provide in an elevating truck, an automatically operable holding device which may be set and released by movement of the handle at any point above its lowermost position.

Another object of the invention is to provide an automatically operable holding device for an elevating truck which is inoperable when the load supporting member is being moved upwardly at any desired speed and which will operate to hold the load supporting member of the truck at any point above its lowermost position when the said member is lowered beyond a predetermined speed.

Other objects of the invention will appear in the detailed description and annexed claims.

With these objects in view, the invention in one of its preferred forms which has been chosen for illustrating the manner in which the invention may be carried out, comprises two relatively movable coöperating members, one of which is attached to the load supporting member of the truck and moves therewith and the other of which is attached to the stationary part of the truck, as the frame, one of said members being provided with means for engaging a part of the other member to hold the two members and thus the load supporting part of the truck at any point between its two extreme positions. This device is preferably arranged to operate and be controlled by the movement of the truck handle either to set the device or to release it. Although the device may be controlled by the movement of the handle under control of the operator, it is primarily set by the movement beyond a predetermined speed of the load supporting member of the truck downwardly whether controlled by the operator or not.

The specific embodiment showing one means for carrying out the invention will be described in connection with the accompanying drawings for the purpose of illustration.

In the drawings: Figure 1 is a side elevation of a truck embodying the invention, with a part thereof cut away in order to better show the position and connections of the safety device. Fig. 2 is a plan view of the safety or holding device shown in detail, with only so much of the truck being shown as to make the manner of connecting the device therewith clear. Fig. 3 is a detail vertical sectional view through a portion of the truck to show the manner of connecting the safety device therein. Fig. 4 is a sectional view similar to Fig. 3 showing the safety device and the load supporting member of the truck in elevated position. Fig. 5 is a sectional view similar to Fig. 4, showing the parts of the safety device in lowered position, this view being taken through the truck on line 5—5, Fig. 2. Fig. 6 is a detail sectional view taken on the line 6—6 of Fig. 3.

Referring to Fig. 1, the truck which I have chosen to illustrate in connection with my improved holding or safety device is similar to the truck shown and described in detail in my co-pending application, Serial No. 820,541, filed Feb. 24, 1914. The invention of the holding or safety device is not limited to the particular type of truck shown in connection therewith for the holding device may be used in connection with practically all of the trucks known as elevating trucks, in which a load supporting member may be raised and lowered, with respect to the truck frame. The specific truck shown, therefore, is chosen for the purpose of illustrating the invention and its operation.

The truck shown in Fig. 1 comprises a main frame portion 8, mounted on two wheels at the rear and one wheel swiveled at the front. The wheel swiveled at the front is adapted to be turned through a fifth wheel structure to which the handle 1 is pivoted, as indicated in the drawings. Super-imposed on the truck frame 8 is a load supporting platform 9. At the four corners of this platform, the racks 12 are provided which engage the teeth of the eccentric gears 11 pivoted at the four corners of the truck frame. Connected to each gear 11 is a cam movable therewith which engages a suitable surface on the platform adjacent the racks 12 and which when turned will move the platform 9 up and down as the case may be. It will be seen that a horizontal movement of the platform 9 caused in any manner will operate to turn the gears 11 and thus elevate or lower the platform. This manner of elevating the load supporting platform or member 9 is described and referred to in my co-pending application and needs no further description here. The horizontal movement of the platform 9 is caused by the operation of the handle 1 which is connected to the platform 9 at one of the cross supporting members as indicated in Fig. 1 by means of the universal joint connection 3, cable 2, the connecting device 4 pivoted at 5 to the adjustable device 6, which in turn is bolted to the toothed bracket 7, connected to the said cross supporting member. These connections and the operation of the same are all described in my said co-pending application. If, when the parts are in the position indicated in Fig. 1, the handle 1 is swung counter-clockwise on its pivot, the platform 9 will be raised. If during this operation the handle 1 slips out of control of the operator it will be seen that the weight of the platform 9 either itself or together with any load supported thereon, will ordinarily cause the platform to be quickly lowered, and, in the specific instance shown, the handle to be rapidly turned on its pivot. In order to prevent accidents from a careless or accidental release of the handle 1, and in order to hold the platform in any one of its elevated positions the following mechanism is provided, which is more particularly the subject-matter of this specific form of the invention.

Referring to Figs. 2 and 3, a bracket 13 is bolted together with the inturned portions of the side bars of the frame 14 to the rear axle 10 of the truck. Extending from the member 13 preferably cast therewith, are two ears carrying the cross rod 15. Pivoted on the cross rod 15 is a sleeve from which extend two longitudinally slotted arms 16. The lower surfaces of these slots are formed in uniform waves and the upper surfaces have formed therein teeth all facing in one direction for a purpose to be described. A casting 18, similar to the casting 13, is bolted to one of the cross supporting members of the platform 9 and provided with two pairs of ears in which the pins 17 are mounted and on these pins are pivoted two longitudinally slotted arms 20 which are adapted to coöperate with, and overlap the pivoted arms 16. At the lower end of each of these arms 20 (see Figs. 2 and 6) I preferably provide an overhanging hook shape portion 21 which extends over the top of, and against the inner side of the arms 16. This structure obviously aids the proper relative movement of the arms. At the lower ends of arms 20 is a gravity latch or dog 23 extending through both slots in arms 16 from one arm 20 to the other and loosely pivoted thereon for a purpose to be described.

By arranging the arms 16 and 20 in overlapping relation as described so that the slots in each pair of arms are arranged in the same line, the arms can be connected for relative sliding movement by means of the pins 19 which are mounted in the outer and upper ends of the arms 16 which pins extend horizontally, one from each arm, to engage its corresponding slot in the adjacent arm 20. The normal position of the pivoted latch is as shown in dotted lines in Fig. 3 and in full lines in Figs. 4 and 5. The weight of the latch is located all at the right side of the pivot points 22 to insure a normal inoperative position therefor. In this normal position the lower end of the latch 23 is adapted to ride along the wavy surface of the slots in the member 16 when the load supporting member is moved. As long as the speed is not excessive the latch will ride down this wavy surface of arms 16 without having any effect on the holding device. The latch will ride up the surface without ever operating at any speed. In this way the platform of the truck or the load supporting member may be moved up and down without operating the safety device. If, however, the speed is increased beyond a certain predetermined point as the load supporting member and the latch 23 descends, the impact of the lower end of the pivoted latch striking against the wavy surface of the slots 16, will cause it to swing counter-clockwise on its pivot points so that it will take the position shown in dotted lines in Fig. 4 and in this position the upper end of the dog, which is shaped like the tooth of a pawl, will engage the teeth on the upper surface of the slots 16 as indicated in Fig. 4. In this position the weight of the platform 9 or the load supporting member will cause the pawl to hold the platform in elevated position. This will be due to the weight of the parts tending to force the arms 20 downwardly and thus force the latch 23 pivoted thereto, against the engaged teeth of the slots in both arms 16. The parts will be held in the position in which the latch stops them until released.

The parts are so designed, as shown, that the latch will operate to lock the parts whenever the platform or load supporting member starts to be lowered beyond a predetermined speed. The instant this undesirable speed is attained the parts will be locked and held until manually released by the operator (in a manner to be described) who, because of the safety device can lower the platform properly or not at all. In raising elevating trucks of the kind now commercially in use, the handle will often fly out of the operator's hand accidentally while he is raising a heavy load. Where this happens the platform and the load falls abruptly often upsetting the load and frequently causing the handle to injure the operator. In order to avoid this, attempts have been made to check the descent of the load by means of a pneumatic check. These checks, however, do not operate quickly enough and in all cases as far as known the platform will be lowered from its elevated position to its lowermost position without being actually stopped at any intermediate point and locked as it will be in the invention herein disclosed. If an operator has a tendency to be careless and lower the platform with a heavy load thereon beyond a safe speed the holding device shown herein will lock the parts at any point in the platform's descent. The operator must then release the parts and start over again and he will soon learn that the platform must be lowered at a certain safe speed for that is the only way in which it is possible to lower the platform.

When the platform has been elevated to its desired position by turning the handle of the truck counter-clockwise the platform may be locked in the elevated position by raising the handle quickly in a clockwise direction. The teeth of arms 16 may be made to lock the parts with the desired degree of safety by a simple matter of design. The truck may then be drawn around to any desired point and the platform lowered by first lowering the handle to pull the platform 9 horizontally a distance just sufficient to disengage the latch 23 from the engaged tooth of the slots 16. As soon as the latch is disengaged it falls due to its own weight and its pivot connections so that its lower end bears against the lower wavy surface of the slots in arms 16. The handle 1 may then be raised slowly under the control of the operator and the platform 9 will be lowered gradually during which time the latch 23 rides up and down on the wavy lower surface of the slots 16 without engaging the teeth of the upper surface unless the speed is increased to the predetermined point.

From the structure described will be seen that it is absolutely impossible for an operator, either purposely or accidentally, to permit or allow the platform to be lowered beyond the predetermined speed at which the latch 23 will operate. The safety device also operates to permit the platform to be locked at any point between its lowermost and uppermost point. In transporting loads over certain floors it is not necessary to raise them as high as where the load is to be carried on the truck over other floors or to an elevator and transported to another floor. Where the floor is perfectly smooth the platform may be elevated only the necessary distance and locked in the desired position.

The invention may obviously be carried out in many other forms than the specific one shown without departing from the scope of the accompanying claims.

What I claim is:

1. In an elevating truck, the combination of a wheel supported truck frame together with a load supporting member and mechanism to raise and lower said member, an automatic mechanically operable means to check the lowering of the said member beyond a predetermined speed.

2. In an elevating truck, the combination of a wheel supported truck frame, together with a load supporting member and mechanism to raise and lower said member, and means operable by the movement of said member beyond a predetermined speed to automatically lock said member against downward movement.

3. In an elevating truck the combination of a wheel supported truck frame, together with a load supporting member and mechanism to raise and lower said member, means operably connected to said member to lock the latter, whenever it is lowered beyond a predetermined speed, all constructed and arranged so that an upward movement of the member will automatically unlock said means.

4. An elevating truck, comprising in combination, a wheel supported truck frame together with a load supporting member and mechanism to raise and lower said member, means to automatically lock said member in one or more of its elevated positions, said means being operably connected to said member and controlled by the speed of said member.

5. An elevating truck comprising in combination, a wheel supported member and mechanism to raise and lower said member, means to automatically lock said member in one or more of its elevated positions, said means being operably connected to said member and controlled in its locking operation by the speed of the member in one direction and in its unlocking operation by a movement of the member in another direction.

6. An elevating truck, comprising in combination, a handle, a wheel supported truck frame, together with a load supporting member and mechanism to raise and lower said member connected to the handle for operation and control, means to automatically lock said member in one or more of its elevated positions, said means being connected to said member and operably controlled by the speed of said member, said means being constructed and arranged for the movement of the handle to unlock the same.

7. An elevating truck having in combination, a wheel supported truck frame, together with a load supporting member and mechanism to raise and lower the same, means to automatically lock said member in one or more of its elevated positions comprising two operably connected portions one fastened to the truck frame and one to the load supporting member for relative movement one to the other, a series of teeth in one portion and a movable latch carried by the other portion, means on the teeth carrying portion to move the latch to engage one of the teeth whenever the said member is lowered beyond a predetermined speed, but at all other times to permit the latch to remain out of engagement with the teeth.

8. An elevating truck having in combination, a wheel supported truck frame, a handle, a load supporting member, mechanism operatively associated with and controlled by the handle to raise and lower the same, a relatively movable holding device operably connected to the frame and the load supporting member including a series of teeth, a latch normally out of engagement therewith and means to move the latch in engagement with the teeth to hold the load supporting member at an elevated point where it was about to be lowered beyond a predetermined speed all constructed and arranged so that the latch may be released by and under the control of the handle.

GEORGE E. CLARK.

Witnesses:
    JAMES D. OUTERSON,
    H. E. HARTWELL.